United States Patent
Moorti

(10) Patent No.: US 7,515,581 B2
(45) Date of Patent: *Apr. 7, 2009

(54) METHOD AND SYSTEM FOR A NEW PACKET PREAMBLE FOR WIDEBAND WIRELESS LOCAL AREA NETWORK (LAN) SYSTEMS

(75) Inventor: Rajendra Tushar Moorti, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 803 days.

This patent is subject to a terminal disclaimer.

(21) Appl. No.: 11/050,505

(22) Filed: Feb. 3, 2005

(65) Prior Publication Data

US 2005/0226208 A1 Oct. 13, 2005

Related U.S. Application Data

(60) Provisional application No. 60/561,738, filed on Apr. 13, 2004.

(51) Int. Cl.
*H04J 3/06* (2006.01)
(52) U.S. Cl. ........................ 370/350; 370/335
(58) Field of Classification Search ........ 370/350, 370/335
See application file for complete search history.

(56) References Cited

U.S. PATENT DOCUMENTS

| | | | |
|---|---|---|---|
| 7,193,994 B1 * | 3/2007 | Payson | 370/380 |
| 7,239,813 B2 * | 7/2007 | Yajima et al. | 370/373 X |
| 2003/0207697 A1 * | 11/2003 | Shpak | 455/524 |
| 2007/0002878 A1 * | 1/2007 | Moorti et al. | 370/401 |

* cited by examiner

*Primary Examiner*—Philip J Sobutka
(74) *Attorney, Agent, or Firm*—McAndrews, Held & Malloy, Ltd.

(57) ABSTRACT

Methods and systems for processing a packet are disclosed herein. Aspects of the method may comprise replicating at least one component of a legacy preamble synchronization symbol to generate a plurality of replicated components of a legacy preamble synchronization symbol. A portion of the generated plurality of replicated components of a legacy preamble synchronization symbol may be grouped and scaled to at least one wide-bandwidth synchronization symbol. A wide-bandwidth preamble may be generated utilizing the wide-bandwidth synchronization symbol. The replicated component of the legacy preamble synchronization symbol may comprise a time domain component and/or a frequency domain component. The time domain component may comprise at least one modulated symbol and the frequency domain component may comprise at least one tone. The grouped generated plurality of replicated components of a legacy preamble synchronization symbol may be scaled with a scaling mask to generate the wide-bandwidth synchronization symbol.

30 Claims, 8 Drawing Sheets

METHOD AND SYSTEM FOR A NEW PACKET PREAMBLE FOR WIDEBAND WIRELESS LOCAL AREA NETWORK (LAN) SYSTEMS

CROSS-REFERENCE TO RELATED APPLICATIONS/INCORPORATION BY REFERENCE

This application makes reference to, claims priority to, and claims the benefit of U.S. Provisional Application Ser. No. 60/561,738, filed Apr. 13, 2004, and entitled "Method and System for a New Packet Preamble for Wideband Wireless LAN Systems," which application is incorporated herein by reference in its entirety.

This application also makes reference to U.S. application Ser. No. 11/021,266, filed Dec. 23, 2004, which is hereby incorporated herein by reference in its entirety.

FIELD OF THE INVENTION

Certain embodiments of the invention relate to the transmission of signals. More specifically, certain embodiments of the invention relate to a method and system for a new packet preamble for wideband wireless LAN systems.

BACKGROUND OF THE INVENTION

Wireless communication systems may utilize one or more packet preambles to facilitate signal detection and further signal processing. The preamble is a portion of the transmission protocol that may comprise a particular sequence which may be used by a receiver, for example, to determine that a packet is present and may also provide a means for the receiver to synchronize itself to the incoming bit stream.

Preambles may be of limited bandwidth, for example, some preambles may only cover 16 MHz of signal bandwidth. This may not be enough for a wider bandwidth signal, for example, a 36.25 MHz wide communications system, to provide reliable preamble processing. Any extension of a legacy 802.11a/g standard preamble carrier detection to wider bandwidths may reduce the repetition rate of the preamble by using more widely spaced tones, or may cause undesired roll-off of the time-domain signal by replicating the same or similar tone values over pairs of consecutive tones.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for processing a packet, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a new packet preamble for wideband wireless LAN systems. A new multi-tone preamble may be used to cover wider bandwidths than may be possible with legacy preambles and may be utilized during time domain or frequency domain transmissions in connection with 802.11a/g preambles or other wireless and/or wireline communication system preambles. Moreover, the new multi-tone preamble may produce lower peak-to-average ratios. The sequence of tones in the multi-tone preamble may cover a quarter of the signaling bandwidth because roughly one out of every four tones has a non-zero value. The sequence may be compatible with legacy systems because it retains the repetition rate, or the inter-tone spacing, for example, 800 ns, as a legacy 802.11a/g standard preamble. However, the preamble utilized by, for example, wideband wireless LAN (WLAN) systems may comprise an increased number of active tones compared to the legacy 802.11a/g preamble.

In accordance with an exemplary aspect of the invention, a legacy preamble synchronization symbol component may be replicated by a determined factor to generate a plurality of replicated legacy preamble synchronization symbol components as part of generating the new wide-bandwidth packet preamble. One or more portions of the replicated legacy preamble synchronization symbol components may be grouped, and the grouped legacy preamble synchronization symbol components may be scaled by a determined scaling mask to generate a wide-bandwidth synchronization symbol.

The wide-bandwidth synchronization symbol may be utilized to generate a wide-bandwidth preamble. For example, a wide-bandwidth preamble may comprise one or more wide-bandwidth synchronization symbols. The spacing between tones within the wide-bandwidth preamble may be increased or decreased according to system requirements, and the number of tones utilized within the new preamble may be expanded by zero-filling energy into additional set of tones. A portion of the tone values may be changed, for example, by scaling the complex values, without incurring substantial changes to the structure of the signal.

Figure 1:
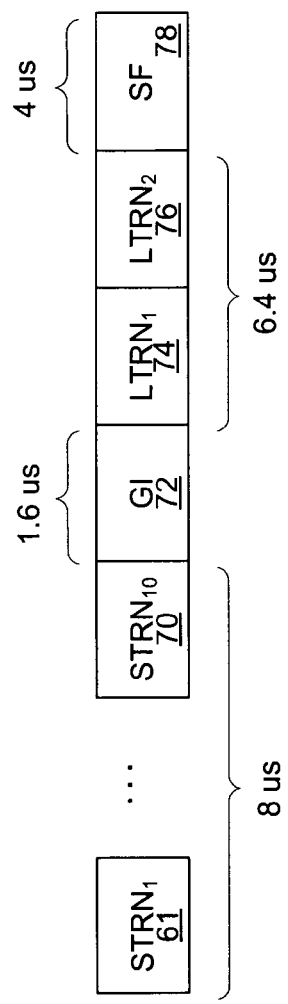
FIG. 1 is a diagram illustrating an exemplary 802.11a/g preamble that may be utilized in accordance with an embodiment of the invention.

FIG. 1 is a diagram illustrating an exemplary 802.11a/g preamble that may be utilized in accordance with an embodiment of the invention. Referring to FIG. 1, the exemplary 802.11a/g preamble 50 may comprise ten short training (STRN) sequences, 61 through 70, two long training (LTRN) sequences, 74 and 76, and a signal field 78. The STRN sequences 61 through 70, and the LTRN sequences 74 and 76 may be separated by a guard interval (GI) 72. Each STRN sequence 61 through 70 may be 800 ns in duration, each LTRN sequence 74 and 76 may be 3.2 us in duration, the signal field 78 may be 4 us in duration, and the guard interval 72 may be 1.6 us in duration. A legacy preamble, such as preamble 50, therefore, may be a total of 20 us in duration.

Figure 2:
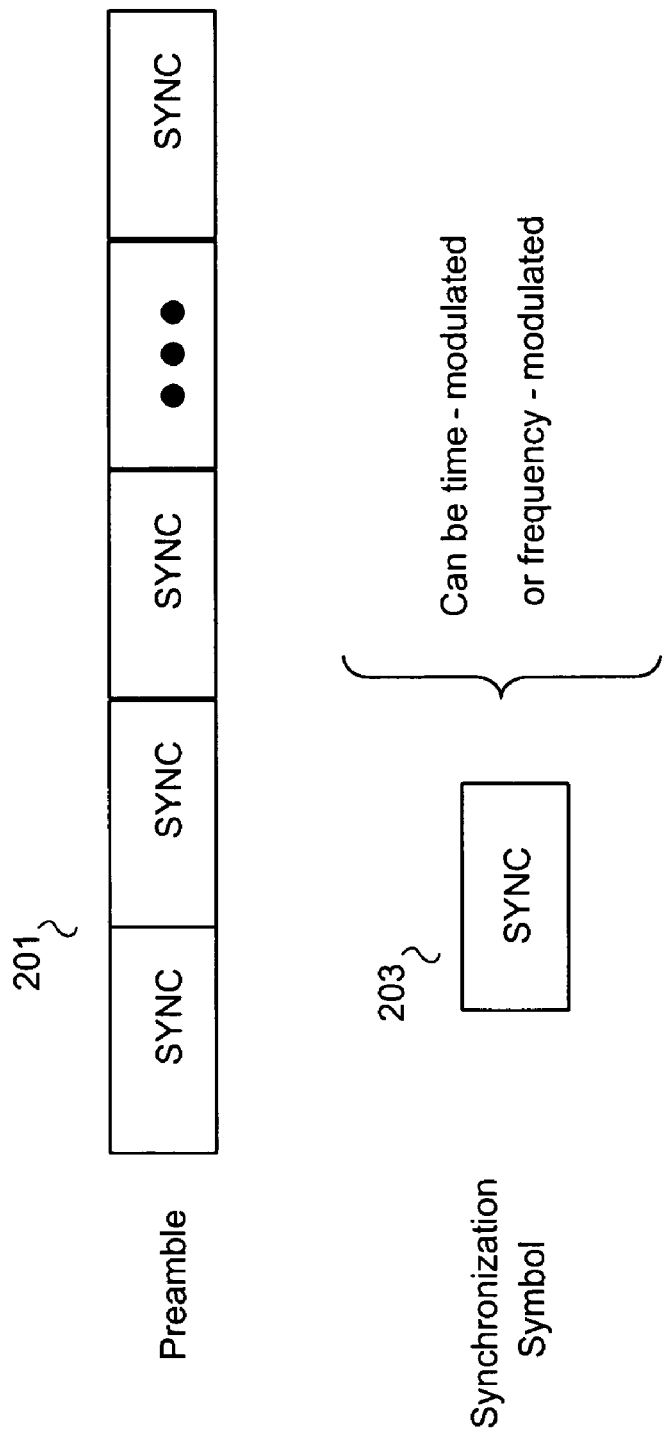
FIG. 2 is a block diagram illustrating a legacy preamble that may be utilized in accordance with an embodiment of the invention.

FIG. 2 is a block diagram illustrating a legacy preamble that may be utilized in accordance with an embodiment of the invention. Referring to FIG. 2, the legacy preamble 201 may comprise a synchronization symbol 203. More specifically, the legacy preamble 201 may comprise a single synchronization symbol 203 or a plurality of synchronization symbols. Each synchronization symbol 203 within the preamble 201 may be time-modulated or frequency-modulated. In an exemplary aspect of the invention, a synchronization symbol 203 may be expanded, grouped, and/or scaled to generate a wide-bandwidth synchronization symbol. The generated wide-bandwidth synchronization symbol may then be utilized to generate a wide-bandwidth preamble. Referring to FIGS. 1 and 2, each short training sequence 61-70 in FIG. 1 is an example of a synchronization symbol 203 for use with an 802.11a/g preamble.

Figure 3:
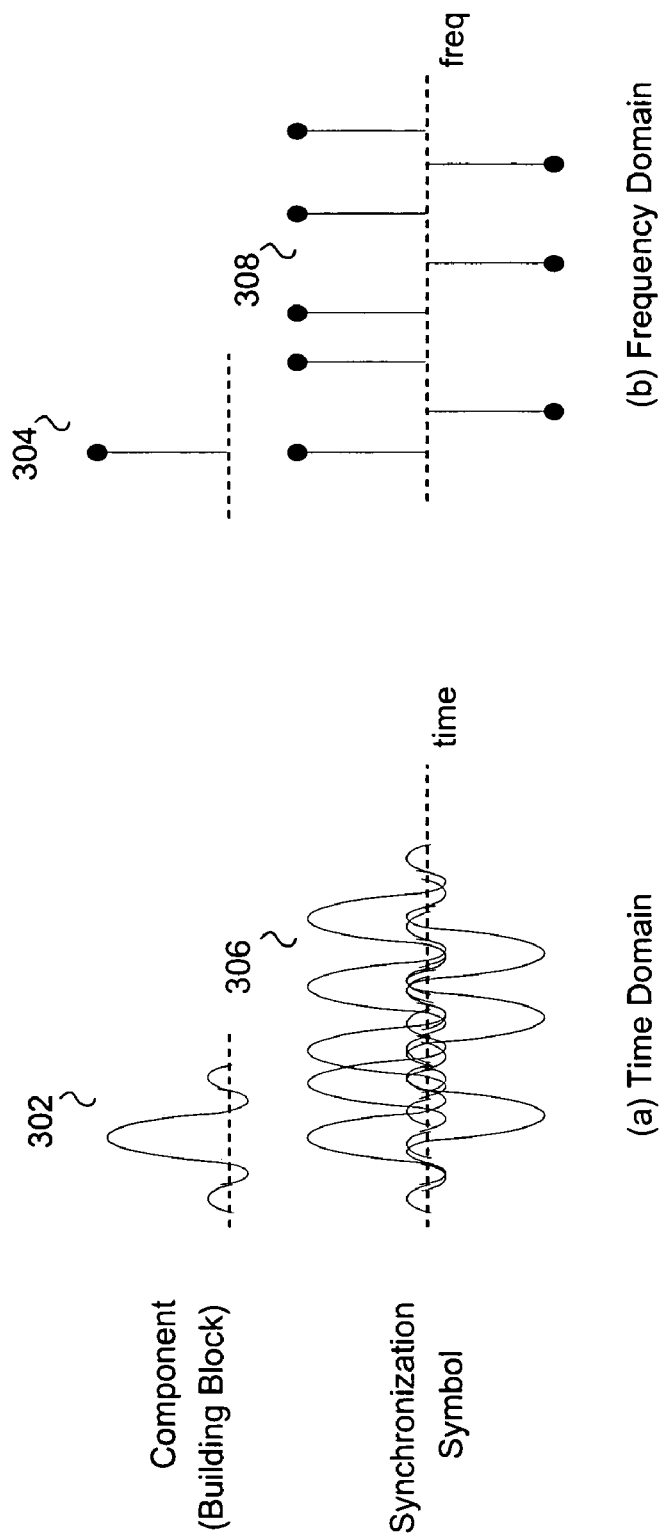
FIG. 3 is a block diagram illustrating a preamble component and synchronization symbol in time and frequency domains, that may be utilized in accordance with an aspect of the invention.

FIG. 3 is a block diagram illustrating a preamble component and synchronization symbol in time and frequency domains, that may be utilized in accordance with an aspect of the invention. A legacy preamble synchronization symbol may comprise a plurality of components either in time-domain or in frequency-domain. Referring to FIG. 3, the synchronization symbol 306 in time-domain may comprise a plurality of components, or building blocks, 302 also in time-domain. Each time-domain component 302 may comprise a time-domain modulation of a set of time symbols, for example.

Similarly, the synchronization symbol 308 in frequency-domain may comprise a plurality of components, or building blocks, 304 also in frequency-domain. Each frequency-domain component 304 may comprise a frequency-domain modulation of a set of tones or subcarriers, for example. In an exemplary aspect of the invention, a synchronization symbol component, such as synchronization symbol component 302 in time-domain, or synchronization symbol component 304 in frequency-domain, may be replicated, grouped, and/or scaled to generate a wide-bandwidth synchronization symbol. The generated wide-bandwidth synchronization symbol may then be utilized to generate a wide-bandwidth preamble.

Figure 4:
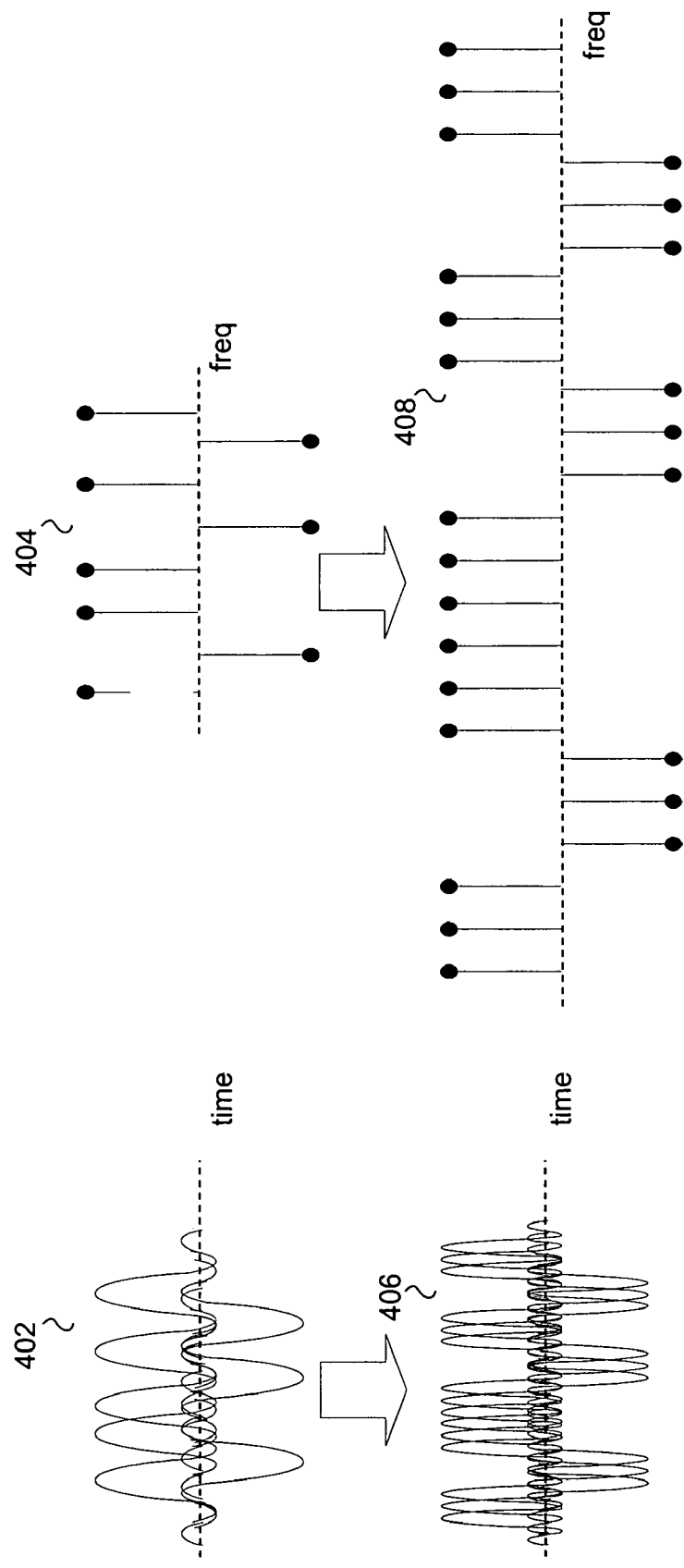
FIG. 4 is a block diagram illustrating preamble component replication, in accordance with an embodiment of the invention.

FIG. 4 is a block diagram illustrating preamble component replication, in accordance with an embodiment of the invention. Referring to FIG. 4, with regard to time-domain modulations, each time-domain component, or time symbol, within the time-domain synchronization symbol 402 may be replicated to generate one or more replicated components of a legacy preamble synchronization symbol 406. During transmission of the replicated components of a legacy preamble synchronization symbol 406, the total preamble transmission time may be kept substantially the same as the legacy preamble transmission time by transmitting at a higher rate.

With regard to frequency-domain modulations, each frequency-domain component, or tone, within the frequency-domain synchronization symbol 404 may be replicated to generate one or more replicated components of a legacy preamble synchronization symbol 408. The bandwidth of the replicated components of a legacy preamble synchronization symbol 408 may be larger than the bandwidth of a legacy preamble. However, the bandwidth of the replicated components of a legacy preamble synchronization symbol 408 may be reduced by reducing inter-tone spacing, for example.

Even though FIG. 4 illustrates preamble component replication with a factor of three, the present invention may not be so limited. Other replication factors may also be utilized during preamble component replication.

Figure 5:
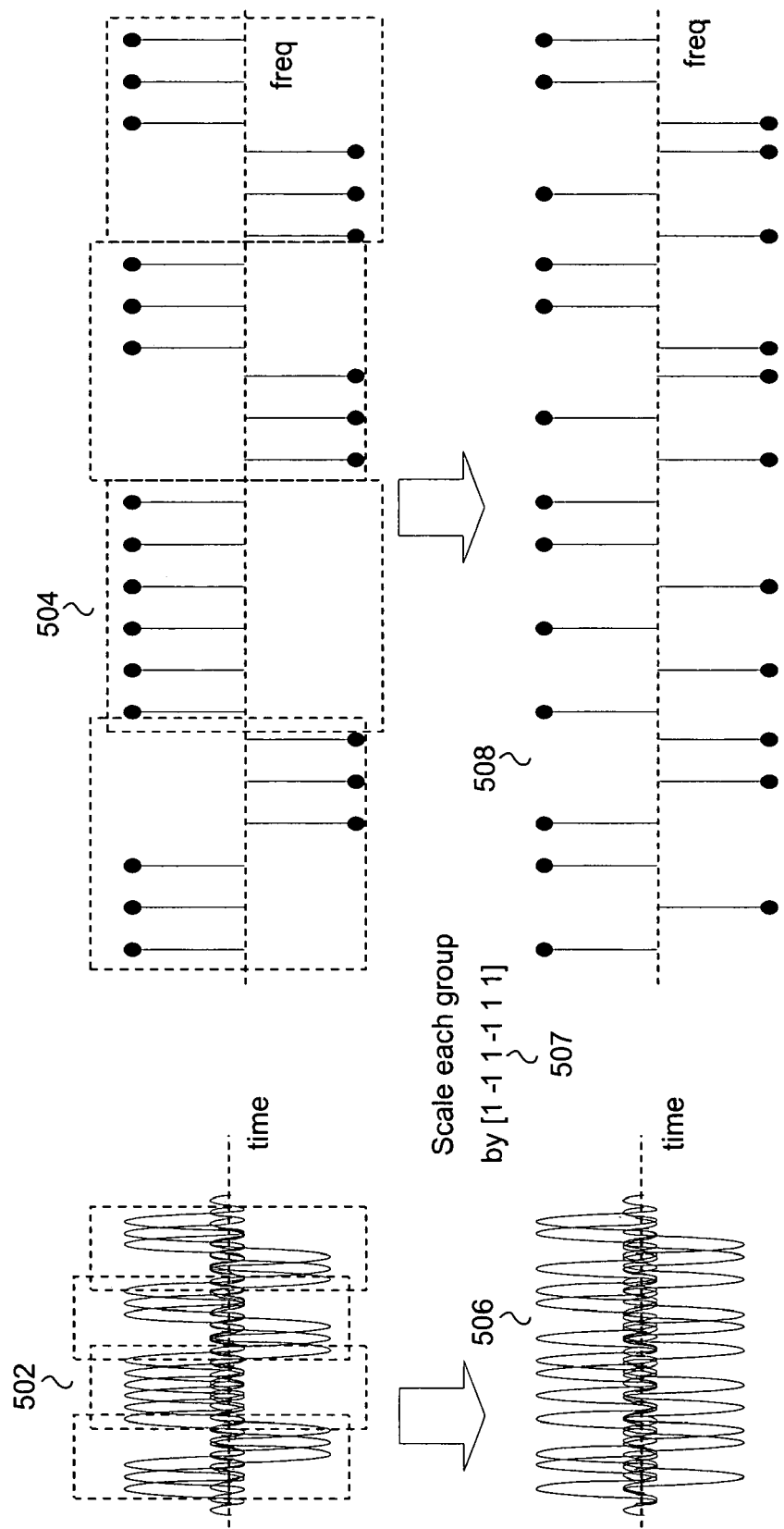
FIG. 5 is a block diagram illustrating replicated preamble symbol grouping and scaling, in accordance with an embodiment of the invention.

FIG. 5 is a block diagram illustrating replicated preamble symbol grouping and scaling, in accordance with an embodiment of the invention. Referring to FIG. 5, a time-domain replicated legacy preamble synchronization symbol components 502 may be grouped together. For example, each of the designated groups in the replicated legacy preamble synchronization symbol components 502 may comprise six time-domain symbols. Similarly, a frequency-domain replicated legacy preamble synchronization symbol components 504 may be grouped together. For example, each of the designated groups in the replicated legacy preamble synchronization symbol components 504 may comprise six frequency-domain tones or subcarriers. Even though groups of six are illustrated on FIG. 5, the present invention may not be so limited and other groups may also be utilized.

Each of the grouped replicated legacy preamble synchronization symbol components 502 and 504 may be scaled with a scaling mask 507 to generate a wide-bandwidth synchronization symbol 506, in time-domain, and 508, in frequency-domain. The scaling mask 507 may comprise a set of weights or multiplicative factors. FIG. 5 illustrates scaling with multiplicative factors [1 −1 1 −1 1 1] so that a second and a fourth symbol/tone may be negated. However, other multiplicative factors may also be utilized.

Figure 6:
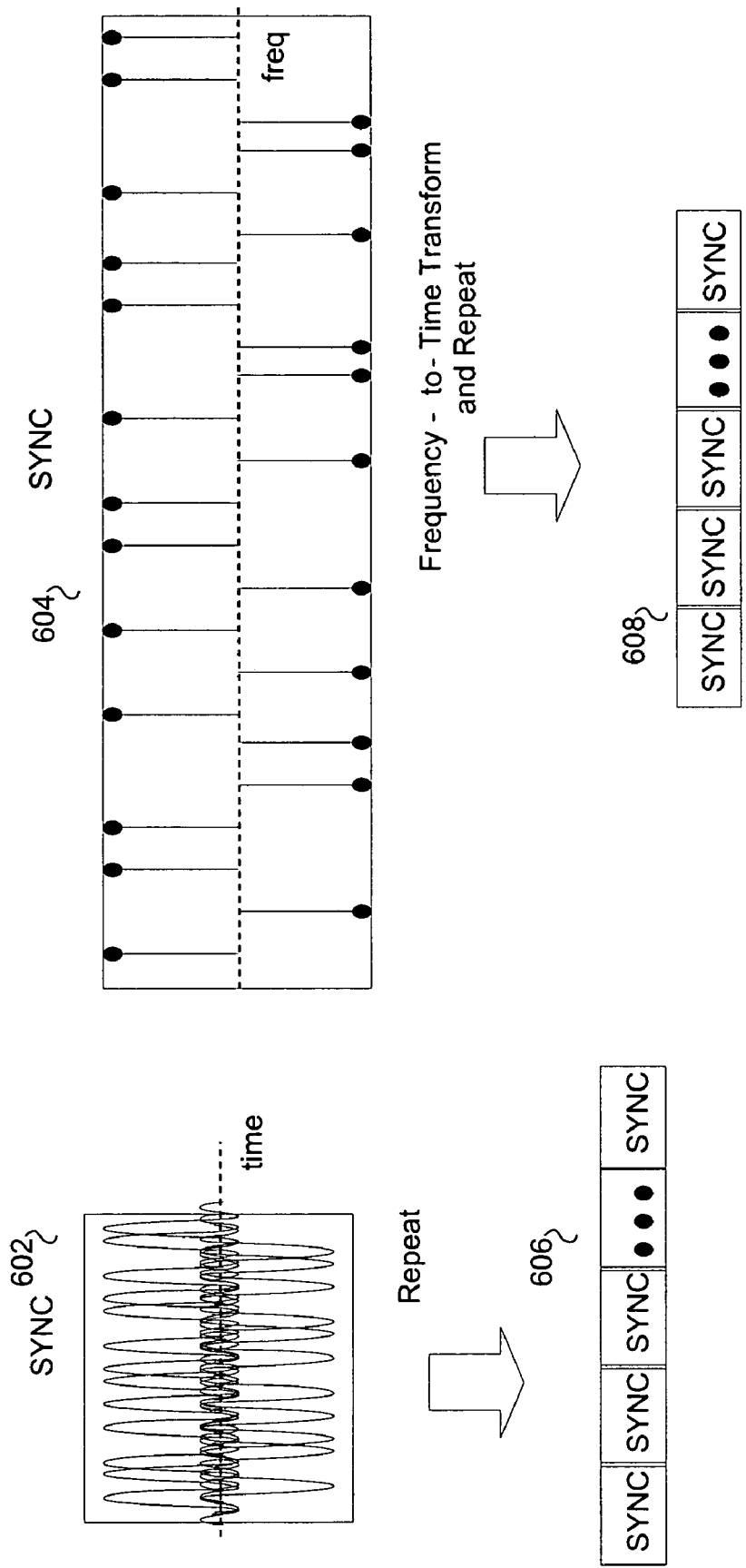
FIG. 6 is a block diagram illustrating wide-bandwidth preamble generation, in accordance with an embodiment of the invention.

FIG. 6 is a block diagram illustrating wide-bandwidth preamble generation, in accordance with an embodiment of the invention. Referring to FIG. 6, a time-domain wide-bandwidth synchronization symbol 602 may be utilized to generate a wide-bandwidth preamble 606. For example, the wide-bandwidth preamble 606 may comprise a single time-domain wide-bandwidth synchronization symbol 602 or the wide-bandwidth preamble 606 may comprise a plurality of time-domain wide-bandwidth synchronization symbols 602.

Similarly, a frequency-domain wide-bandwidth synchronization symbol 604 may be utilized to generate a wide-bandwidth preamble 608 via frequency-to-time transformation and repetition. For example, the wide-bandwidth preamble 608 may comprise a single time-domain transformed wide-bandwidth synchronization symbol 604 or the wide-bandwidth preamble 608 may comprise a plurality of time-domain transformed wide-bandwidth synchronization symbols 604.

Figure 7:
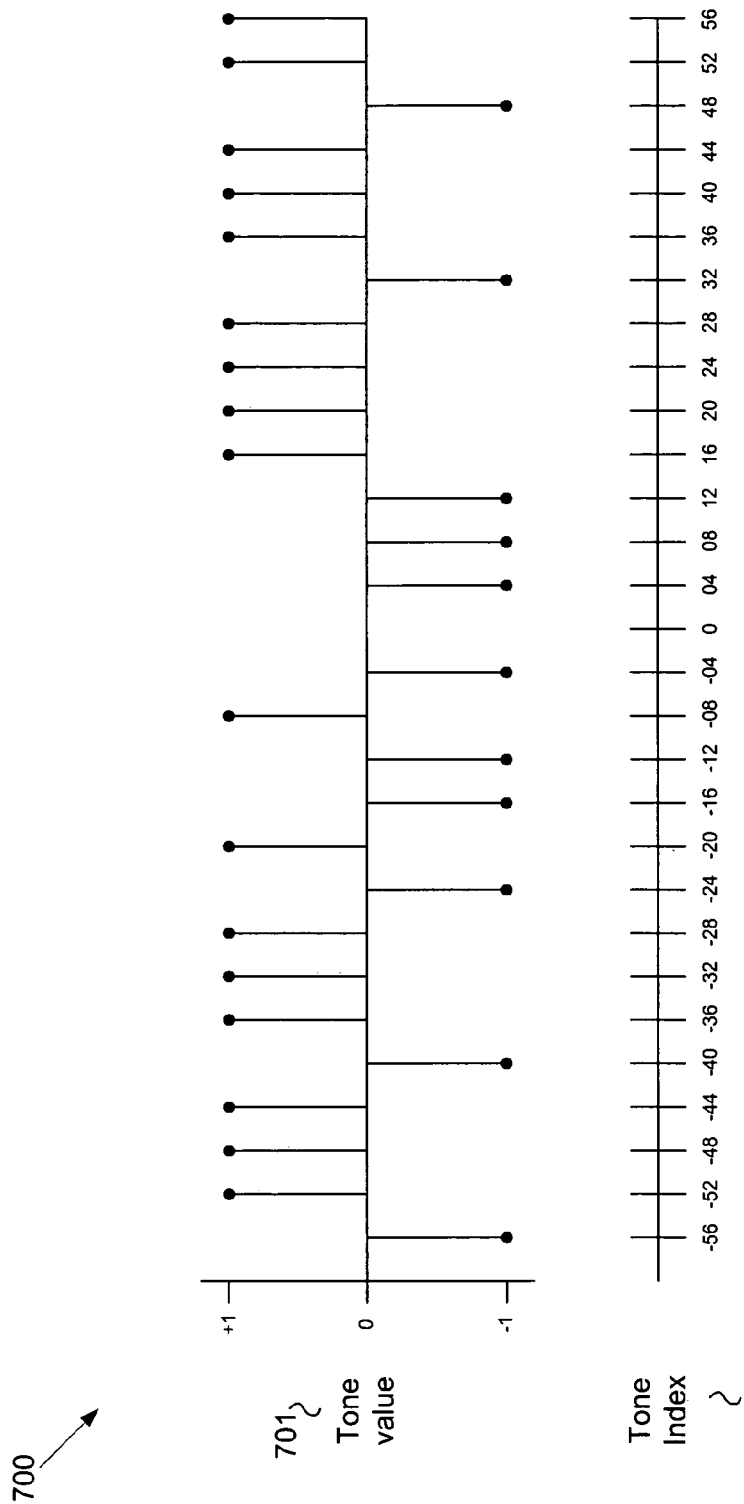
FIG. 7 is a diagram illustrating an exemplary multi-tone preamble sequence, in accordance with an embodiment of the invention.

FIG. 7 is a diagram illustrating an exemplary multi-tone preamble sequence, in accordance with an embodiment of the invention. Referring to FIG. 7, the exemplary preamble sequence 700 may comprise a plurality of frequency tones with scaled tone values 701. Each of the scaled tone values 701 may correspond to a tone index 703. Each tone value 701 for the packet preamble 700 may be represented by a preamble component having a value of, for example, 1 or (−1). The components for preamble 700 may represent a scaled version of one or more synchronization symbols. In this regard, components corresponding to the tone values 701 may represent synchronization symbols prior to scaling and normalization processing. For example, a positive value of a synchronization symbol may be transmitted if a corresponding constellation point comprises 1. Similarly, a negative value of a synchronization symbol may be transmitted if a corresponding constellation point comprises (−1). The exemplary preamble sequence 700 may be utilized as a multi-tone preamble for a 36.25 MHz signal, for example, with intertone spacing of 312.5 kHz. This sequence may be created by replicating, grouping, and/or scaling a known legacy preamble, such as an 802.11a/g preamble.

In an exemplary aspect of the invention, the multi-tone preamble sequence 700 may be generated by initially replicating by a factor of two, legacy subcarrier tones with non-zero value from legacy tone modulating values, such as an 802.11a/g preamble. The replicated preamble may then be grouped into sets of four tones, for example. The grouped sets may be scaled with a scaling mask, such as [1 1 1 −1], to generate the multi-tone preamble 700. In this regard, generation of the multi-tone preamble 700 may be represented by the following sequences:

Legacy tone modulating values:
[1 −1 1 −1 −1 1 0 −1 −1 1 1 1 1]
Replicated legacy tone modulating values by a factor of two:
[1 1 −1−1 1 1 −1−1 −1−1 1 1 0 −1−1 −1−1 1 1 1 1 1 1 1 1]
Grouped preamble tones into sets of four:
[{1 1 −1−1} {1 1 −1−1} {−1−1 1 1} 0 {−1−1 −1−1} {1 1 1 1} {11 11}]
Scaled grouped preamble tones with a scaling mask [1 1 1 −1]:
[1 1 −1 1 1 1 −1 1 −1−1 1 −1 0 −1−1 −1 1 1 1 1 −1 1 1 1 −1]

While the multi-tone preamble sequence 700 may be generated utilizing legacy tone modulating values, replication by a factor of two and scaling by a four-tone mask [1 1 1 −1], the present invention may not be limited in this manner. Other replication factors may also be utilized, depending on the desired signal bandwidth that may be covered by the new preamble. For example, a replicating factor of two may correspond to a two-fold expansion in the signal bandwidth and a replicating factor of three may correspond to a three-fold expansion in the signal bandwidth. In addition, a different scaling mask may be utilized during scaling of the grouped replicated preamble.

In the exemplary multi-tone preamble sequence 700, the tone index 0 may correspond to the center frequency and tone index −32 may correspond to the tone at −10 MHz from the center frequency. In this example, the modulating values of the tones at indexes −56, −52, +52, and +56 may be randomly assigned after a −48 to +48 multi-tone sequence has been generated pursuant to the replication, grouping, and/or scaling technique illustrated above. The number of tone indexes, the tone values, and the center frequency may be system and/or standard dependent. Additionally, inter-tone spacing may be preserved between the exemplary multi-tone preamble sequence 700 and the legacy preamble it may be based on. For example, each of the tone values 701, including tone values not shown on FIG. 7, such as tone values with symbol component of zero, may be separated by inter-tone spacing of 312.5 kHz, which may be the same inter-tone spacing utilized in legacy preambles.

In another exemplary aspect of the invention, the sequence of tones in the multi-tone preamble sequence 700 may be scaled by any complex value, and a corresponding time-domain signal may be scaled, shifted, and/or rotated without compromising the structure of the proposed new preamble sequence. The spacing between tones may be increased or decreased according to system and/or standard requirements and the number of tones used may be expanded by zero-filling energy into the set of tones to be included. In addition, a portion of the tone values may be changed, for example, by scaling the corresponding complex values, without incurring substantial changes to the structure of the signal.

Figure 8:
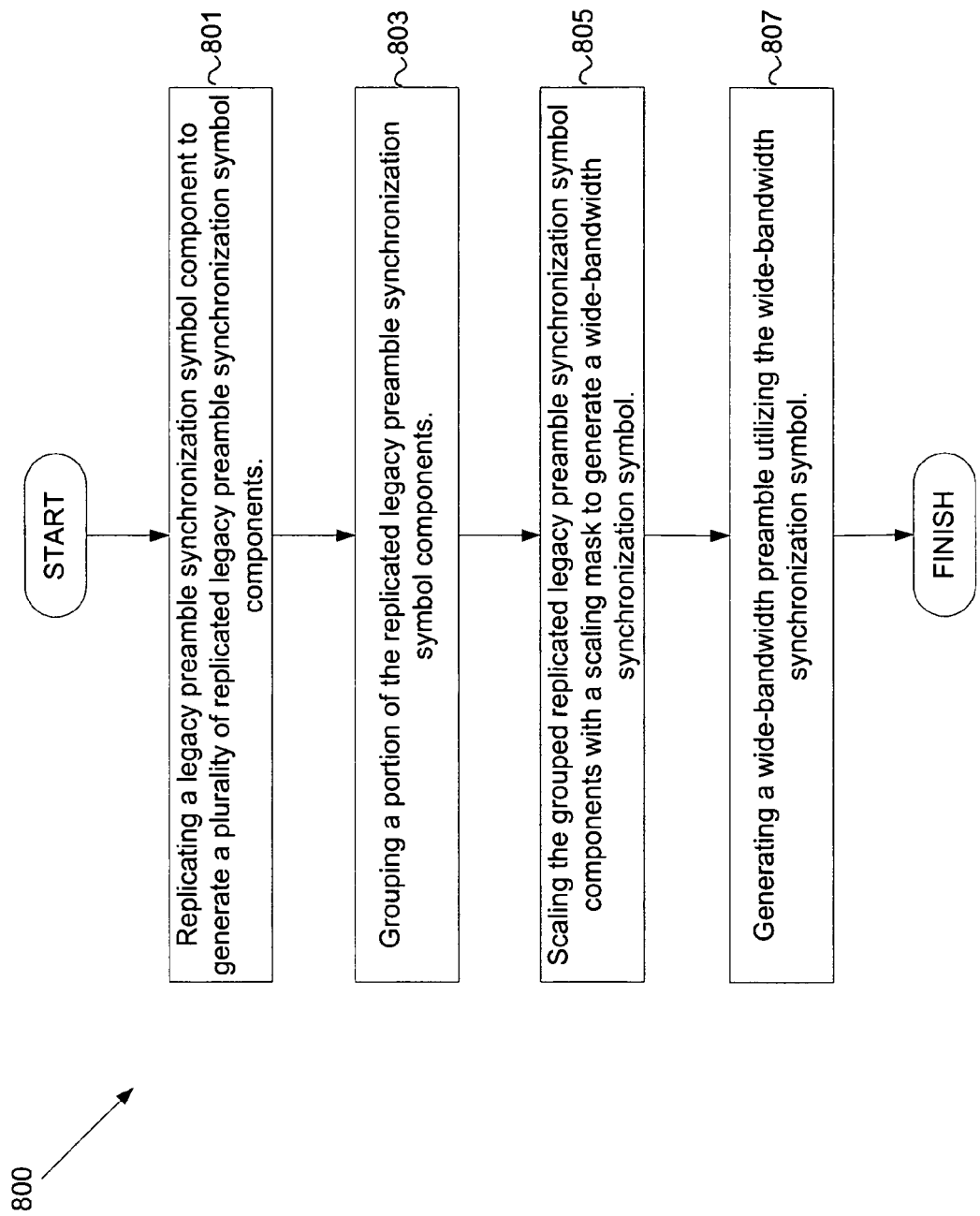
FIG. 8 is a flow diagram of an exemplary method for generating a wide-bandwidth preamble, in accordance with an embodiment of the invention.

FIG. 8 is a flow diagram of an exemplary method for generating a wide-bandwidth preamble, in accordance with an embodiment of the invention. Referring to FIG. 8, at 801, a legacy preamble synchronization symbol component may be replicated to generate a plurality of replicated components of a legacy preamble synchronization symbol. During replication, different replicating factors may be utilized, depending on a desired signal bandwidth corresponding to the wide-bandwidth preamble. At 803, one or more portions of the replicated components of a legacy preamble synchronization symbol may be grouped. At 805, the grouped legacy preamble synchronization symbol components may be scaled with a determined scaling mask to generate a wide-bandwidth synchronization symbol. At 807, a wide-bandwidth preamble may be generated utilizing the wide-bandwidth synchronization symbol. For example, a wide-bandwidth preamble may comprise a single wide-bandwidth synchronization symbol or a plurality of wide-bandwidth synchronization symbols.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing a packet, the method comprising:
    replicating at least one component of a legacy preamble synchronization symbol to generate a plurality of replicated components of a legacy preamble synchronization symbol;
    grouping at least a portion of said generated plurality of replicated components of a legacy preamble synchronization symbol; and
    scaling at least a portion of said grouped at least a portion of said generated plurality of replicated components of a legacy preamble synchronization symbol to generate at least one wide-bandwidth synchronization symbol.

2. The method according to claim 1, comprising:
generating a wide-bandwidth preamble utilizing said generated at least one wide-bandwidth synchronization symbol.

3. The method according to claim 1, wherein said replicated at least one component of said legacy preamble synchronization symbol comprises one or both of a time domain component and/or a frequency domain component.

4. The method according to claim 3, wherein said time domain component comprises at least one modulated symbol.

5. The method according to claim 3, wherein said frequency domain component comprises at least one tone.

6. The method according to claim 1, comprising:
scaling said at least a portion of said grouped at least a portion of said generated plurality of replicated components of a legacy preamble synchronization symbol with a scaling mask to generate said at least one wide-bandwidth synchronization symbol.

7. The method according to claim 6, wherein said scaling mask is a multiple of a replicating factor utilized by said replicating to generate said plurality of replicated components of a legacy preamble synchronization symbol.

8. The method according to claim 1, wherein said generated at least one wide-bandwidth synchronization symbol comprises a plurality of active and inactive tones with inter-tone spacing of about 312.5 kHz.

9. A machine-readable storage having stored thereon, a computer program having at least one code section for processing a packet, the at least one code section being executable by a machine to perform steps comprising:
replicating at least one component of a legacy preamble synchronization symbol to generate a plurality of replicated components of a legacy preamble synchronization symbol;
grouping at least a portion of said generated plurality of replicated components of a legacy preamble synchronization symbol; and
scaling at least a portion of said grouped at least a portion of said generated plurality of replicated components of a legacy preamble synchronization symbol to generate at least one wide-bandwidth synchronization symbol.

10. The machine-readable storage according to claim 9, comprising code for generating a wide-bandwidth preamble utilizing said generated at least one wide-bandwidth synchronization symbol.

11. The machine-readable storage according to claim 9, wherein said replicated at least one component of said legacy preamble synchronization symbol comprises one or both of a time domain component and/or a frequency domain component.

12. The machine-readable storage according to claim 11, wherein said time domain component comprises at least one modulated symbol.

13. The machine-readable storage according to claim 11, wherein said frequency domain component comprises at least one tone.

14. The machine-readable storage according to claim 9, comprising code for scaling said at least a portion of said grouped at least a portion of said generated plurality of replicated components of a legacy preamble synchronization symbol with a scaling mask to generate said at least one wide-bandwidth synchronization symbol.

15. The machine-readable storage according to claim 14, wherein said scaling mask is a multiple of a replicating factor utilized by said replicating to generate said plurality of replicated components of a legacy preamble synchronization symbol.

16. The machine-readable storage according to claim 9, wherein said generated at least one wide-bandwidth synchronization symbol comprises a plurality of active and inactive tones with inter-tone spacing of about 312.5 kHz.

17. A system for processing a packet, the system comprising:
at least one processor that replicates at least one component of a legacy preamble synchronization symbol to generate a plurality of replicated components of a legacy preamble synchronization symbol;
said at least one processor groups at least a portion of said generated plurality of replicated components of a legacy preamble synchronization symbol; and
said at least one processor scales at least a portion of said grouped at least a portion of said generated plurality of replicated components of a legacy preamble synchronization symbol to generate at least one wide-bandwidth synchronization symbol.

18. The system according to claim 17, wherein said at least one processor generates a wide-bandwidth preamble utilizing said generated at least one wide-bandwidth synchronization symbol.

19. The system according to claim 17, wherein said replicated at least one component of said legacy preamble synchronization symbol comprises one or both of a time domain component and/or a frequency domain component.

20. The system according to claim 19, wherein said time domain component comprises at least one modulated symbol.

21. The system according to claim 19, wherein said frequency domain component comprises at least one tone.

22. The system according to claim 17, wherein said at least one processor scales said at least a portion of said grouped at least a portion of said generated plurality of replicated components of a legacy preamble synchronization symbol with a scaling mask to generate said at least one wide-bandwidth synchronization symbol.

23. The system according to claim 22, wherein said scaling mask is a multiple of a replicating factor utilized by said replicating to generate said plurality of replicated components of a legacy preamble synchronization symbol.

24. The system according to claim 17, wherein said generated at least one wide-bandwidth synchronization symbol comprises a plurality of active and inactive tones with inter-tone spacing of about 312.5 khz.

25. A method for processing a packet, the method comprising:
replicating at least one component of a legacy preamble synchronization symbol to generate a plurality of replicated components of a legacy preamble synchronization symbol;
grouping at least a portion of said generated plurality of replicated components of a legacy preamble synchronization symbol;
scaling at least a portion of said grouped at least a portion of said generated plurality of replicated components of a legacy preamble synchronization symbol to generate at least one wide-bandwidth synchronization symbol; and
preserving inter-tone spacing between said legacy preamble synchronization symbol and said generated at least one wide-bandwidth synchronization symbol by said scaling said at least a portion of said grouped at least a portion of said generated plurality of replicated components of a legacy preamble synchronization symbol.

26. A method for processing a packet, the method comprising:
- replicating at least one component of a legacy preamble synchronization symbol to generate a plurality of replicated components of a legacy preamble synchronization symbol;
- grouping at least a portion of said generated plurality of replicated components of a legacy preamble synchronization symbol;
- scaling at least a portion of said grouped at least a portion of said generated plurality of replicated components of a legacy preamble synchronization symbol to generate at least one wide-bandwidth synchronization symbol; and
- preserving periodicity between said legacy preamble synchronization symbol and said generated at least one wide-bandwidth synchronization symbol by said scaling said at least a portion of said grouped at least a portion of said generated plurality of replicated components of a legacy preamble synchronization symbol.

27. A machine-readable storage having stored thereon, a computer program having at least one code section for processing a packet, the at least one code section being executable by a machine to perform steps comprising:
- replicating at least one component of a legacy preamble synchronization symbol to generate a plurality of replicated components of a legacy preamble synchronization symbol;
- grouping at least a portion of said generated plurality of replicated components of a legacy preamble synchronization symbol;
- scaling at least a portion of said grouped at least a portion of said generated plurality of replicated components of a legacy preamble synchronization symbol to generate at least one wide-bandwidth synchronization symbol; and
- preserving inter-tone spacing between said legacy preamble synchronization symbol and said generated at least one wide-bandwidth synchronization symbol by said scaling said at least a portion of said grouped at least a portion of said generated plurality of replicated components of a legacy preamble synchronization symbol.

28. A machine-readable storage having stored thereon, a computer program having at least one code section for processing a packet, the at least one code section being executable by a machine to perform steps comprising:
- replicating at least one component of a legacy preamble synchronization symbol to generate a plurality of replicated components of a legacy preamble synchronization symbol;
- grouping at least a portion of said generated plurality of replicated components of a legacy preamble synchronization symbol;
- scaling at least a portion of said grouped at least a portion of said generated plurality of replicated components of a legacy preamble synchronization symbol to generate at least one wide-bandwidth synchronization symbol; and
- preserving periodicity between said legacy preamble synchronization symbol and said generated at least one wide-bandwidth synchronization symbol by said scaling said at least a portion of said grouped at least a portion of said generated plurality of replicated components of a legacy preamble synchronization symbol.

29. A system for processing a packet, the system comprising:
- at least one processor that replicates at least one component of a legacy preamble synchronization symbol to generate a plurality of replicated components of a legacy preamble synchronization symbol;
- said at least one processor groups at least a portion of said generated plurality of replicated components of a legacy preamble synchronization symbol;
- said at least one processor scales at least a portion of said grouped at least a portion of said generated plurality of replicated components of a legacy preamble synchronization symbol to generate at least one wide-bandwidth synchronization symbol; and
- wherein said at least one processor preserves inter-tone spacing between said legacy preamble synchronization symbol and said generated at least one wide-bandwidth synchronization symbol by said scaling said at least a portion of said grouped at least a portion of said generated plurality of replicated components of a legacy preamble synchronization symbol.

30. A system for processing a packet, the system comprising:
- at least one processor that replicates at least one component of a legacy preamble synchronization symbol to generate a plurality of replicated components of a legacy preamble synchronization symbol;
- said at least one processor groups at least a portion of said generated plurality of replicated components of a legacy preamble synchronization symbol;
- said at least one processor scales at least a portion of said grouped at least a portion of said generated plurality of replicated components of a legacy preamble synchronization symbol to generate at least one wide-bandwidth synchronization symbol; and
- wherein said at least one processor preserves periodicity between said legacy preamble synchronization symbol and said generated at least one wide-bandwidth synchronization symbol by said scaling said at least a portion of said grouped at least a portion of said generated plurality of replicated components of a legacy preamble synchronization symbol.

* * * * *